UNITED STATES PATENT OFFICE.

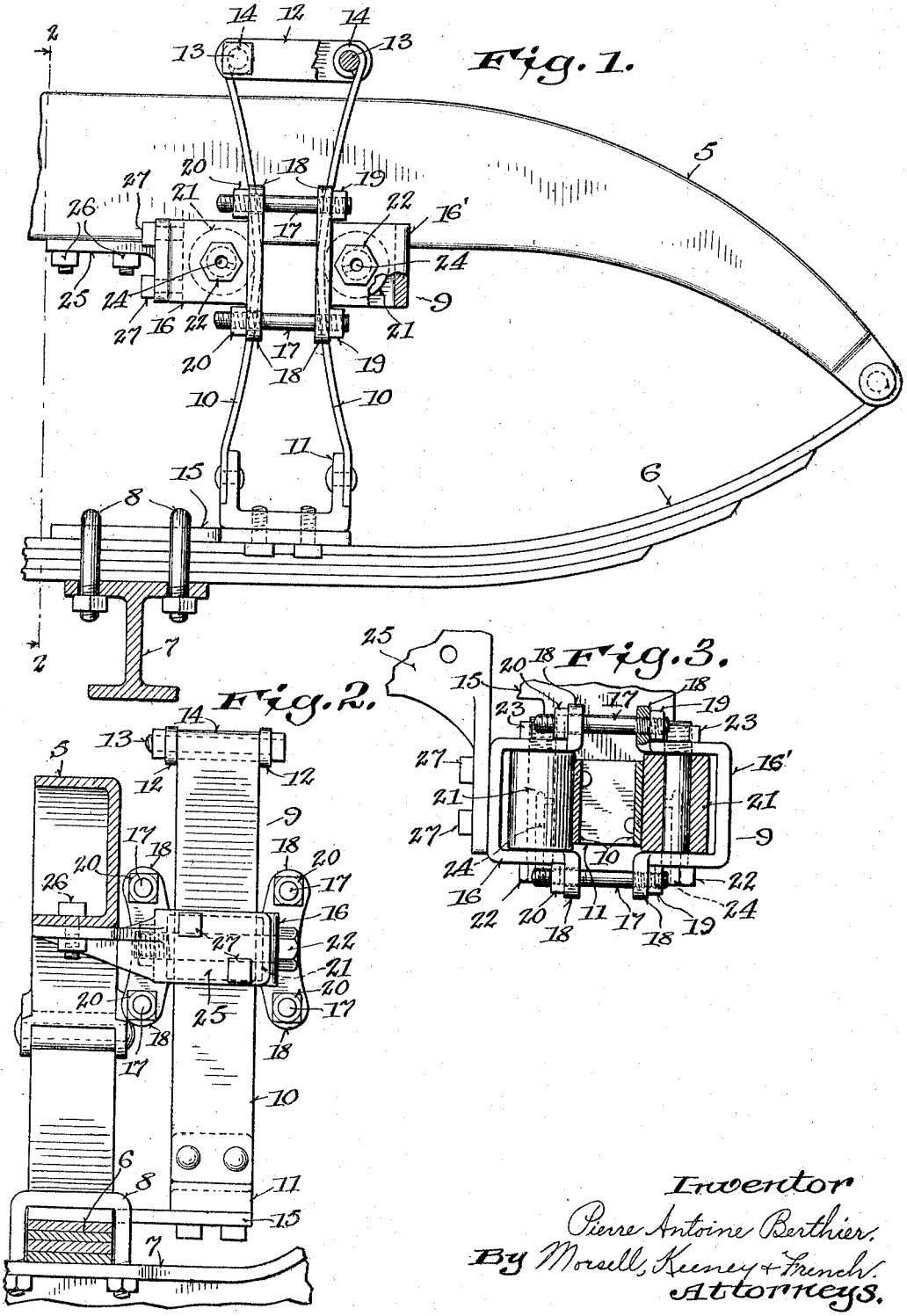

PIERRE ANTOINE BERTHIER, OF MILWAUKEE, WISCONSIN.

SHOCK-ABSORBER.

1,316,135.  Specification of Letters Patent.  Patented Sept. 16, 1919.

Application filed October 25, 1917. Serial No. 198,471.

*To all whom it may concern:*

Be it known that I, PIERRE ANTOINE BERTHIER, a citizen of the Republic of France, who has taken out his first papers as a citizen of the United States, and resident of Milwaukee, in the county of Milwaukee and State of Wisconsin, have invented new and useful Improvements in Shock-Absorbers, of which the following is a description, reference being had to the accompanying drawings, which are a part of this specification.

This invention relates to improvements in shock absorbers.

Ordinary springs forming part of an automobile permit the body portion to unnecessarily rebound a number of times when an obstruction or a depression is encountered. This movement when excessive is liable to cause breakage of the parts and does not conduce to the pleasure of the occupants of the vehicle.

It is one of the objects of the present invention to overcome the before mentioned objectionable features and provide a shock absorber which will minimize the shocks or rebounds without interfering with the yielding of the automobile springs.

A further object of the invention is to provide a shock absorber which may be easily attached to a vehicle and which may be easily adjusted without removal to withstand varying loads.

A further object of the invention is to provide a shock absorber which will exert a tendency to maintain the parts in a medial position.

A further object of the invention is to provide a shock absorber which is of simple construction, is strong and durable and is well adapted for the purpose described.

With the above and other objects in view the invention consists of the improved shock absorber and its parts and combinations as set forth in the claims and all equivalents thereof.

In the accompanying drawing in which the same reference characters indicate the same parts in all of the views:

Figure 1 is a fragmentary side view of the running gear of an automobile provided with the improved shock absorber, parts being shown in section;

Fig. 2 is a vertical sectional view thereof taken on line 2—2 of Fig. 1; and

Fig. 3 is a top view of the shock absorber, parts shown in section.

Referring to the drawing the numeral 5 indicates a portion of the running gear frame of an automobile, 6 the half elliptical spring connected to the end thereof, 7 the axle upon which the spring is mounted by means of U-bolts 8, and 9 the improved shock absorber connected to the frame and to the elliptical spring. The shock absorber comprises two vertically extending flat spring members or yielding elements 10 connected at their lower end portions to a U-shaped member 11 and having their upper ends linked together by links 12 and bolts 13 which extend through eyes 14 formed by bending the upper ends of said springs.

The U-shaped member is bolted to and supported on an L-shaped bracket 15 which is clamped to the half elliptical spring by the U-bolts 8. The U-shaped and L-shaped members serving as the support for the absorber may be formed of one piece of material if desired.

Two angular members 16 and 16′ positioned on opposite sides of the pair of vertically extending yielding elements or springs 10 are adjustably connected together by stud bolts 17 positioned on opposite edge portions of the yielding elements and which extend through eyed ears 18 formed on the outer and inner edge portions of the angular members 16 and 16′. The stud bolts 17 are threaded through the ears of the member 16′ and have lock nuts 19 threaded on their projecting ends whereas the opposite end portions of the stud bolts extend freely through the unthreaded ears of the member 16 and have nuts 20 threaded thereon. Anti-friction rollers 21 carried by the angular members and positioned to bear against the outer sides of the springs or yielding elements 10 are journaled on bolts 22 which extend through the angular members at right angles to the stud bolts 17. The bolts 22 are in part threaded through the angular members and have lock nuts 23 threaded thereon and also have oil holes 24 formed therein for feeding oil to the bores of the rollers. The rollers and the angular members are of greater length than the width of the springs to permit lateral play of the frame member with relation to the axle or elliptical springs.

An upper bracket member 25 bolted to the lower surface of the frame 5 by bolts 26 projects outwardly therefrom and is connected to one of the angular members 16 or 16' by bolts 27 to firmly attach the said members thereto.

Four of the devices are considered as a set and are preferably attached to the running gear of an automobile but a greater or a less number may be used if desired.

The angular members and the parts carried thereby form the relatively movable element and the vertical springs and connected parts form the relative fixed element of the absorber.

The flat springs are placed under the desired tension by the stud bolts and nuts and when adjusted and the device is attached in the manner shown, the springs of the running gear will operate in the usual manner.

In operating, the movable element of the absorber will play vertically on the springs with an increasing resistance to absorb the shock. The greater the movement the greater the resistance, due to the greater angle of the springs the nearer the movable element approaches the ends of the springs, and also due to the less resilience of the springs adjacent their connection with the links or the supporting member.

The absorber will operate to produce the same results connected upside down or turned a quarter turn from the position shown.

From the foregoing description it will be seen that the shock absorber is of very simple construction and is well adapted to perform the function desired.

What I claim as my invention is:

1. The combination with a running gear frame having a yielding connection with the axles, of a shock absorber therefor, comprising a member connected to the axle, another member connected to the frame, a pair of flat springs projecting in a vertical line from one of the members and edgewise to the frame, means pivotally connecting the free ends of the springs together, and rollers carried by the other member, said rollers positioned on medial opposite sides of the pair of springs and pressing the said medial sides of said springs inwardly toward each other and closer together than their opposite ends.

2. The combination with a running gear frame having a yielding connection with the axles, of a shock absorber therefor, comprising a supporting member connected to the axle, a pair of flat springs connected to the supporting member and extending upwardly therefrom in spaced relation and having upper eyed ends, a pivotal connection for the upper eyed ends of said springs, and angular members adjustably connected together and supported by the frame and positioned on opposite sides of the pair of springs and having rollers which engage medial portions of the springs and hold said portions under tension and closer together than their outer end portions.

3. The combination with a running gear frame having a yielding connection with the axles, of a shock absorber therefor, comprising a supporting member connected to the axle, a pair of flat springs connected to the supporting member and extending upwardly therefrom in spaced relation and having upper eyed ends, a pivotal connection for the upper eyed ends of said springs, angular members supported by the frame and positioned on opposite sides of the pair of springs and having rollers which engage medial portions of the springs, and means for fixedly adjusting the distance apart of the rollers and the medial portions of the springs.

4. The combination with a running gear frame having a yielding connection with the axles, of a shock absorber therefor, comprising a supporting member connected to the axle, a pair of flat spaced springs connected thereto and extending upwardly therefrom, links connecting the upper ends of said springs together, angular members supported by the frame and positioned on opposite sides of the pair of springs and having rollers which engage medial portions of said opposite sides of the pair of springs and curve them inwardly toward each other, and bolts adjustably connecting the angular members together.

5. A shock absorber, comprising a supporting member, flat springs connected at one end in spaced relation to the supporting member, a link connecting the free ends of the springs together, a frame member, angular members supported therefrom and positioned on opposite sides of the pair of springs and having rollers which engage medial portions of said opposite sides of the pair of springs and curve them inwardly toward each other, and bolts adjustably connecting the angular members together.

In testimony whereof I affix my signature.

PIERRE ANTOINE BERTHIER.

Copies of this patent may be obtained for five cents each, by addressing the "Commissioner of Patents, Washington, D. C."